(12) United States Patent
Kim et al.

(10) Patent No.: US 9,625,619 B2
(45) Date of Patent: Apr. 18, 2017

(54) OPTICAL FILM ASSEMBLY, DISPLAY APPARATUS HAVING THE SAME AND METHOD OF MANUFACTURING THE SAME

(71) Applicant: SAMSUNG DISPLAY CO., LTD., Yongin, Gyeonggi-Do (KR)

(72) Inventors: Soo-Won Kim, Gangwon-do (KR); Moon-Seok Roh, Gyeonggi-do (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 6 days.

(21) Appl. No.: 14/325,893

(22) Filed: Jul. 8, 2014

(65) Prior Publication Data
US 2015/0015958 A1    Jan. 15, 2015

(30) Foreign Application Priority Data
Jul. 11, 2013  (KR) .......................... 10-2013-0081558

(51) Int. Cl.
| | | |
|---|---|---|
| *G02F 1/1335* | (2006.01) | |
| *G02B 1/11* | (2015.01) | |
| *G02B 27/00* | (2006.01) | |
| *G02B 5/28* | (2006.01) | |
| *G02B 1/115* | (2015.01) | |

(52) U.S. Cl.
CPC ................ *G02B 1/11* (2013.01); *G02B 1/115* (2013.01); *G02B 5/285* (2013.01); *G02B 27/0006* (2013.01); *G02F 1/1335* (2013.01); *G02F 1/133502* (2013.01)

(58) Field of Classification Search
CPC .......... G06F 3/041; G02B 27/52; H01J 29/88; G02F 1/133502
USPC ................ 359/584, 585, 586, 601; 345/173; 349/58, 137; 313/478
See application file for complete search history.

(56) References Cited

U.S. PATENT DOCUMENTS

| | | | | |
|---|---|---|---|---|
| 5,025,490 A | * | 6/1991 | Tamura | .................... H01J 29/88 313/478 |
| 7,042,662 B2 | * | 5/2006 | Murata | .................. G02B 27/52 359/885 |
| 2006/0017706 A1 | * | 1/2006 | Cutherell | ................ G06F 3/041 345/173 |
| 2006/0082696 A1 | | 4/2006 | Kim | |
| 2011/0310488 A1 | * | 12/2011 | Tomotoshi | ........ G02F 1/133308 359/601 |
| 2013/0029450 A1 | | 1/2013 | Jeong et al. | |

FOREIGN PATENT DOCUMENTS

| | | | |
|---|---|---|---|
| KR | 10-2006-0034878 A | 4/2006 | |
| KR | 10-2012-0057708 A | 6/2012 | |
| KR | 10-2013-0020334 A | 2/2013 | |

* cited by examiner

*Primary Examiner* — Audrey Y Chang
(74) *Attorney, Agent, or Firm* — Lee & Morse, P.C.

(57) ABSTRACT

An optical film assembly includes an anti-reflection film including a plurality of stacked anti-reflection layers, a side surface of the anti-reflection film being inclined with respect to an upper surface of a display panel, the anti-reflection layers having different thicknesses and different refractivities, and an anti-fingerprint film on the anti-reflection film, the anti-fingerprint film being integral with the anti-reflection film, the anti-fingerprint film being hydrophobic.

8 Claims, 16 Drawing Sheets

OPTICAL FILM ASSEMBLY, DISPLAY APPARATUS HAVING THE SAME AND METHOD OF MANUFACTURING THE SAME

CROSS-REFERENCE TO RELATED APPLICATION

Korean Patent Application No. 10-2013-0081558, filed on Jul. 11, 2013, in the Korean Intellectual Property Office, and entitled: "Optical Film Assembly, Display Apparatus Having The Same and Method Of Manufacturing The Same," is incorporated by reference herein in its entirety.

BACKGROUND

1. Field

Example embodiments relate generally to an optical film assembly, a display apparatus having the same and a method of manufacturing the same.

2. Description of the Related Art

A flat panel display apparatus has various characteristics such as thin thickness, small size, light weight, low power consumption, etc., and thus has been widely used in various fields.

The flat panel display apparatus has high portability and may be used in various environments such as outdoors.

SUMMARY

Embodiments are directed to an optical film assembly including an anti-reflection film including a plurality of stacked anti-reflection layers, a side surface of the anti-reflection film being inclined with respect to an upper surface of a display panel, the anti-reflection layers having different thicknesses and different refractivities, and an anti-fingerprint film on the anti-reflection film, the anti-fingerprint film being integral with the anti-reflection film, the anti-fingerprint film being hydrophobic.

The anti-reflection layers may include a plurality of low refractive layers and a plurality of high refractive layers that are alternately arranged.

A side surface of the anti-fingerprint film may be inclined along with, and as an extension of, the side surface of the anti-reflection film.

The anti-reflection film may further include an anti-reflection layer that extends outwardly beyond the side surface.

Embodiments are also directed to a display apparatus including a display panel including an internal region and a peripheral region surrounding the internal region, the display panel displaying an image, and an optical film assembly including an anti-reflection film in the internal region of the display panel, the anti-reflection film preventing external light that is reflected from the display panel from being viewed and an anti-fingerprint film on the anti-reflection film, the anti-fingerprint film being hydrophobic.

A side surface of the anti-reflection film may be inclined with respect to an upper surface of the display panel.

The internal region may include a display region in which the image is displayed and an interface region surrounding the display region. The inclined side surface of the anti-reflection film may be in the interface region.

A side surface of the anti-fingerprint film may be inclined along with, and as an extension of, the inclined side surface of the anti-reflection film.

The side surface of the anti-reflection film may be substantially perpendicular to an upper surface of the display panel.

The anti-reflection film may include a plurality of stacked anti-reflection layers having different thicknesses and different refractivities.

A portion of the anti-reflection layers may extend toward the peripheral region. A remaining portion of the anti-reflection layers may be disposed only in the internal region.

The portion of the anti-reflection layers that extends toward the peripheral region may reflect external light to display a predetermined hue in the peripheral region.

The display apparatus may further include an adhesive layer between the display panel and the anti-reflection film to increase adhesiveness of the anti-reflection film.

Embodiments are also directed to a method of manufacturing an optical film assembly including aligning a mask on a display panel, the display panel including an internal region and a peripheral region surrounding the internal region, the mask covering the peripheral region, depositing a refractive material on the display panel using the mask to form an anti-reflection film, and depositing a hydrophobic material on the anti-reflection film to form an anti-fingerprint film.

An inner surface of the mask may be substantially perpendicular to an upper surface of the display panel.

A side surface of the anti-reflection film may be inclined with respect to the upper surface of the display panel.

An inner surface of the mask may be inclined with respect to an upper surface of the display panel.

A side surface of the anti-reflection film may be substantially perpendicular to the upper surface of the display panel.

The anti-reflection film may be formed by alternately depositing different material having different refractivities using the mask.

The method may further include depositing a refractive material in the internal region and the peripheral region without any mask.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
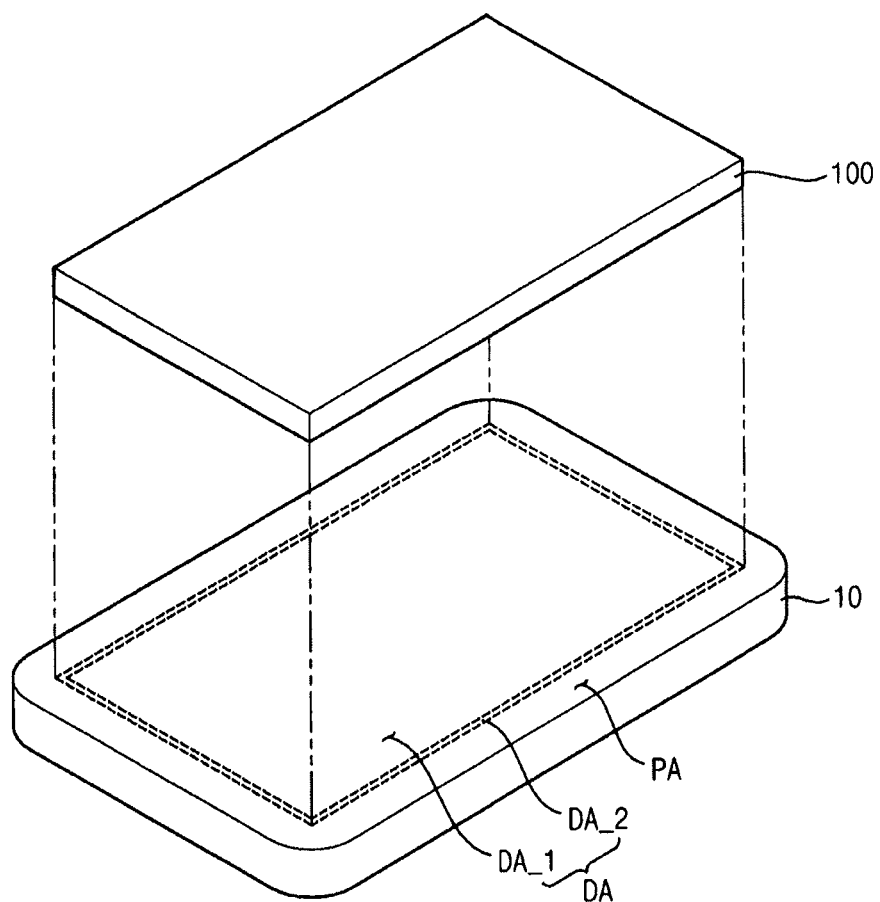
FIG. 1 illustrates a perspective view depicting a display apparatus according to an example embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings thereof. As used herein, the term "and/or" includes any and all combinations of one or more of the associated listed items.

Unless otherwise defined, all terms (including technical and scientific terms) used herein have the same meaning as commonly understood by one of ordinary skill in the relevant art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
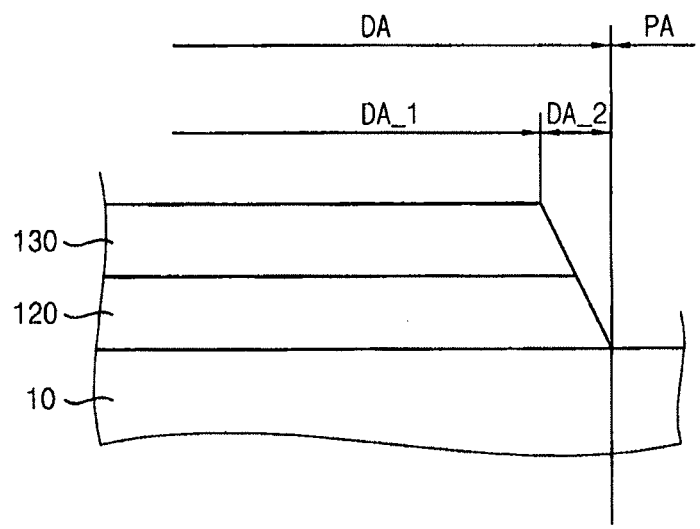
FIG. 2 illustrates a cross-sectional view depicting an optical film assembly of FIG. 1.

FIG. 1 illustrates a perspective view depicting a display apparatus according to one example embodiment. FIG. 2 illustrates a cross-sectional view depicting an optical film assembly of FIG. 1.

Referring to FIGS. 1 and 2, the display apparatus may include a display panel 10 and an optical film assembly 100.

The display panel 10 displays an image based on an externally provided image signal. In the present example embodiment, the display panel 10 includes a flat display panel. For example, the display panel 10 may include an organic light emitting display panel. In other implementations, the display panel 10 may include a liquid crystal display panel, an electrophoretic display panel, a plasma display panel, etc.

In the present example embodiment, the display panel 10 may further include an integrally formed touch panel (not shown). The touch panel (not shown) changes a touch operation that is touched through the optical film assembly 100 into an electric signal.

The display panel 10 may have an internal region DA and a peripheral region PA. The internal region DA is disposed in the display panel 10. The peripheral region PA surrounds the internal region DA. A logo, a design, etc., may be printed in the peripheral region PA of the display panel 10 to improve beauty of the display apparatus.

The internal region DA may include a display region DA_1 and an interface region DA_2 that surrounds the display region DA_1. In the present example embodiment, the interface region DA_2 may be interposed between the display region DA_1 and the peripheral region PA, and may have a thin ring shape.

The optical film assembly 100 is disposed on the display panel 10. In the present example embodiment, the optical film assembly 100 may only be disposed in the internal region DA of the display panel 10.

The optical film assembly 100 includes an anti-reflection film 120 and an anti-fingerprint film 130.

The anti-reflection film 120 may be disposed on the display panel 10 to prevent the reflection of external light. Herein, external light may include natural or artificial, indoor or outdoor light, such as sunlight, ambient indoor lighting, etc. In the present example embodiment, the anti-reflection film 120 is integrally formed onto an upper surface of the display panel 10, and has a side surface that is inclined with respect to the upper surface of the display panel 10. In other implementations, the side surface of the anti-reflection film 120 may be substantially perpendicular to the upper surface of the display panel 10.

A lower surface of the anti-reflection film 120 may correspond to a boundary between the internal region DA and the peripheral region PA. The inclined side surface of the anti-reflection film 120 may be disposed in the interface region DA_2 of the internal region DA.

The anti-reflection film 120 may be a nano-pattern type having a plurality of nano patterns (not shown), a multi-layer type having a plurality of multi-layers (not shown), etc. A thickness of the anti-reflection film 120 may be, for example, about 100 Å to about 250 Å.

In the nano-pattern type, a plurality of nano patterns (not shown) may be formed on a transparent layer, and the external light may be refracted from the nano patterns. The refracted light may be guided towards a side surface of the display panel 10 or a direction opposite to a viewer so that the refracted light may not be viewable to the viewer.

In the multi-layer type, a portion of the external light that is reflected from an upper surface of the anti-reflection film 120 may be delayed by a half wavelength from a portion of the external light that is reflected from a lower surface of the anti-reflection film 120. The two portions of reflected light that are delayed by the half wavelength are overlapped or out of phase so as to cancel each other, such that the reflected light may not be viewable.

The anti-reflection film 120 of the multi-layer type may include transparent material, and may have a mono layered structure or a multi-layered structure. When the anti-reflection film 120 has the multi-layer type, examples of the transparent material that may be used for the anti-reflection film 120 may include titanium oxide ($TiO_2$), silicon oxide ($SiO_2$), magnesium fluoride ($MgF_2$), zirconium oxide ($ZrO_x$), aluminum oxide ($Al_2O_3$), indium-tin-oxide (ITO), tin-oxide (TO), indium-zinc-oxide (IZO), zinc-oxide (ZO), etc.

When the anti-reflection film 120 has the mono layered structure, the anti-reflection film 120 may include one kind of transparent material having low refractivity. For example, the anti-reflection film 120 having the mono layered structure may include magnesium fluoride ($MgF_2$).

When the anti-reflection film 120 has the multi layered structure, the anti-reflection film 120 may have at least one layer having low refractivity and at least one layer having high refractivity that alternate with each other. For example, the layer having the low refractivity may include silicon oxide $SiO_2$, and the layer having the high refractivity may include titanium oxide $TiO_2$. The thickness and refractivity of each of the layers of the multi layered structure may be selected based on the wavelength of light that may be reflected from each of the layers. For example, the kind of the material and the thickness of each of the layers may be designed to reflect four to eight wavelengths of visible light. When a layer corresponding to a predetermined color is omitted in the multi layered structure, only a portion of the external light corresponding to the predetermined color may be viewed.

The anti-fingerprint film 130 may be disposed on the anti-reflection film 120 to prevent external pollutants from being attached to the optical film assembly 100. The anti-fingerprint film 130 may be integrally formed with an upper surface of the anti-reflection film 120, and a side surface of the anti-fingerprint film 130 may be inclined with respect to the upper surface of the display panel 10. In other implementations, the side surface of the anti-fingerprint film 130 may be substantially perpendicular to the upper surface of the display panel 10.

The upper surface of the anti-fingerprint film 130 may correspond to a boundary between the display region DA_1 and the interface region DA_2. The inclined side surface of the anti-fingerprint film 130 may be disposed in the interface region DA_2 of the internal region DA.

The anti-fingerprint film 130 may include hydrophobic material such that a pollutant such as liquid pollutant may be easily removed from the anti-fingerprint film 130. Examples of the hydrophobic material that may be used for the anti-fingerprint film 130 may include a fluorine based high polymer, a silicon based high polymer, a fluorine based surfactant, etc. For example, the anti-fingerprint film 130 may have a thickness of about 100 Å to about 250 Å. In other implementations, the anti-fingerprint film 130 may include a plurality of nano patterns (not shown).

According to the present example embodiment, the anti-reflection film 120 and the anti-fingerprint film 130 are not formed in the peripheral region PA such that the visibility of a logo, design, etc., that are printed in the peripheral region PA may be increased.

The anti-reflection film 130 including the metal oxide, etc., may be disposed between the anti-fingerprint film 130 and the display panel 10 such that the anti-fingerprint film 130 may be easily attached to the display panel 10.

Figure 3:
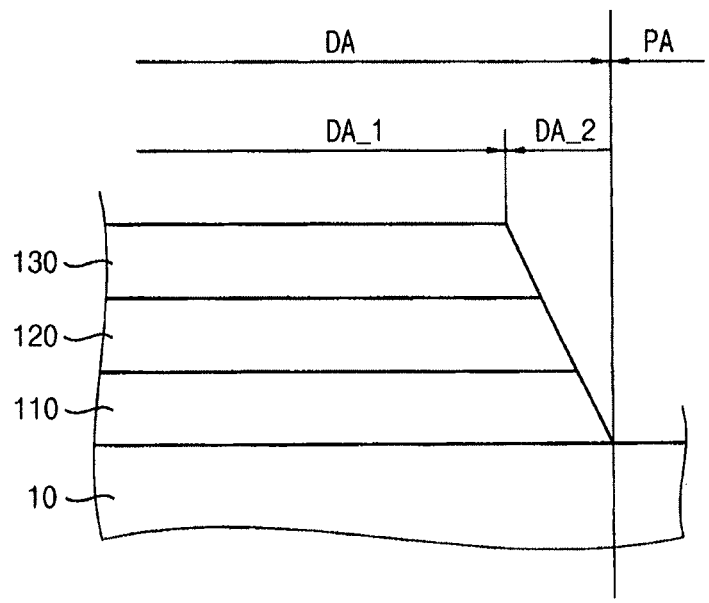
FIG. 3 illustrates a cross-sectional view depicting an optical film assembly according to another example embodiment.

FIG. 3 illustrates a cross-sectional view depicting an optical film assembly according to another example embodiment. The optical film assembly of FIG. 3 may be substantially the same as the optical film assembly shown in FIGS. 1 and 2 except for further including an adhesive layer. Thus, descriptions concerning the same elements will not be repeated.

Referring to FIGS. 1 to 3, the display apparatus may include a display panel 10 and an optical film assembly 100.

The display panel 10 may have an internal region DA and a peripheral region PA. The internal region DA may be disposed in the display panel 10. The peripheral region PA surrounds the internal region DA. The internal region DA includes a display region DA_1 and an interface region DA_2 that surrounds the display region DA_1.

The optical film assembly 100 may be disposed on the display panel 10. In the present example embodiment, the optical film assembly 100 may be only disposed in the internal region DA of the display panel 10.

The optical film assembly 100 may include an adhesive layer 110, an anti-reflection film 120, and an anti-fingerprint film 130.

The adhesive layer 110 may be disposed on the display panel 10. For example, the adhesive layer 110 may be integrally attached to an upper surface of the display panel 10, and a side surface of the adhesive layer 110 may be inclined with respect to the upper surface of the display panel 10. In other implementations, the side surface of the adhesive layer 110 may be substantially perpendicular to the upper surface of the display panel 10.

A lower surface of the adhesive layer 110 may correspond to a boundary between the internal region DA and the interface region DA_2.

The adhesive layer 110 may increase the adhesiveness between the anti-reflection film 120 and the display panel 10. The adhesive layer 110 may include a transparent material. For example, the adhesive layer 110 may include silicon oxide $SiO_2$, and may have a thickness of about 120 Å to about 150 Å.

The anti-reflection film 120 may be disposed on the display panel 10. The anti-reflection film 120 may have a side surface that is inclined with respect to the upper surface of the display panel 10.

The anti-fingerprint film 130 may be disposed on the anti-reflection film 120 to prevent external pollutants from being attached to the optical film assembly 100. For example, the anti-fingerprint film 130 may be integrally formed with an upper surface of the anti-reflection film 120. A side surface of the anti-fingerprint film 130 may be inclined with respect to the upper surface of the display panel 10.

The upper surface of the anti-fingerprint film 130 may correspond to a boundary between the display region DA_1 and the interface region DA_2.

According to the present example embodiment, the adhesive layer 110 may be interposed between the display panel 10 and the anti-reflection film 120 to increase the adhesiveness between the optical film assembly 100 and the display panel 10.

Figure 4:
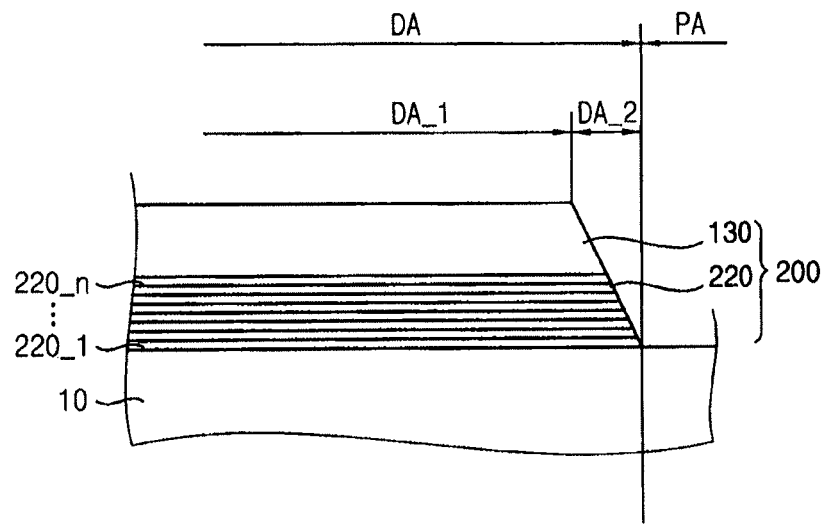
FIG. 4 illustrates a cross-sectional view depicting an optical film assembly according to another example embodiment.

FIG. 4 illustrates a cross-sectional view depicting an optical film assembly according to another example embodiment. The optical film assembly of FIG. 4 illustrates substantially the same as the optical film assembly shown in FIGS. 1 and 2 except for the structure of an anti-reflection film. Thus, explanations concerning the same elements will not be repeated.

Referring to FIG. 4, the display apparatus may include a display panel 10 and an optical film assembly 200.

The display panel 10 may have an internal region DA and a peripheral region PA. The internal region DA may be disposed in the display panel 10. The peripheral region PA may surround the internal region DA. The internal region DA may include a display region DA_1 and an interface region DA_2 that surrounds the display region DA_1.

The optical film assembly 200 may be disposed on the display panel 10. In the present example embodiment, the optical film assembly 200 may be disposed only in the internal region DA of the display panel 10.

The optical film assembly 200 may include an anti-reflection film 220 and an anti-fingerprint film 130.

The anti-reflection film 220 may be disposed on the display panel 10 to prevent the reflection of an external light. In the present example embodiment, the anti-reflection film 220 may be integrally formed on an upper surface of the display panel 10, and may have a side surface that is inclined with respect to the upper surface of the display panel 10.

A lower surface of the anti-reflection film 220 may correspond to a boundary between the internal region DA and the peripheral region PA. The inclined side surface of the anti-reflection film 220 may be disposed in the interface region DA_2 of the internal region DA.

The anti-reflection film 220 may be a multi-layer type. For example, the anti-reflection film 220 includes first to n-th refractive layers 220_1, . . . 220_$n$ having different refractivities.

A portion of an external light reflected from a lower surface of each of the refractive layers 220_1, . . . 220_$n$ may have a phase that is delayed by a half wavelength with respect to another portion of the external light reflected from an upper surface of each of the refractive layers 220_1, . . . 220_$n$. The two portions of light having the phase difference of a half wavelength may cancel each other out due to destructive interference such that the light may not be viewable to a user. In the present example embodiment, the refractivity and thickness of each of the refractive layer 220_1, . . . 220_$n$ may correspond to different wavelengths. For example, the half wavelengths corresponding to the refractive layers 220_1, . . . 220_$n$ may be uniformly distributed in a visible light range, so that the external light reflected from the optical film assembly 200 may not be viewable to the viewer due to the destructive interference.

In the present example, the refractive layers 220_1, . . . 220_$n$ may be alternately arranged with the refractive layers having a high refractivity and the refractive layer having a low refractivity. Examples of a material having low refractivity may include metal oxide such as magnesium fluoride ($MgF_2$), silicon oxide ($SiO_2$), etc., synthetic polymer such as polymethylpentene (PTX), etc. Examples of a material having high refractivity may include zirconium oxide ($ZrO_2$), aluminum oxide ($Al_2O_3$), indium-tin-oxide (ITO), tin-oxide (TO), indium-zinc-oxide (IZO), zinc-oxide (ZO), etc.

The anti-fingerprint film 130 may be disposed on the anti-reflection film 220 to prevent external pollutants from being attached to the optical film assembly 100. An inclined side surface of the anti-fingerprint film 130 may be disposed in the interface region DA_2 of the internal region DA.

FIGS. 5 and 7 to 10 illustrate cross-sectional views depicting stages of a method of manufacturing the optical film assembly of FIG. 4. In the present example embodiment, the refractive layers 220_1, . . . 220_$n$ correspond to first to n-th anti-reflection layers 220_1, . . . 220_$n$, respectively.

Figure 5:
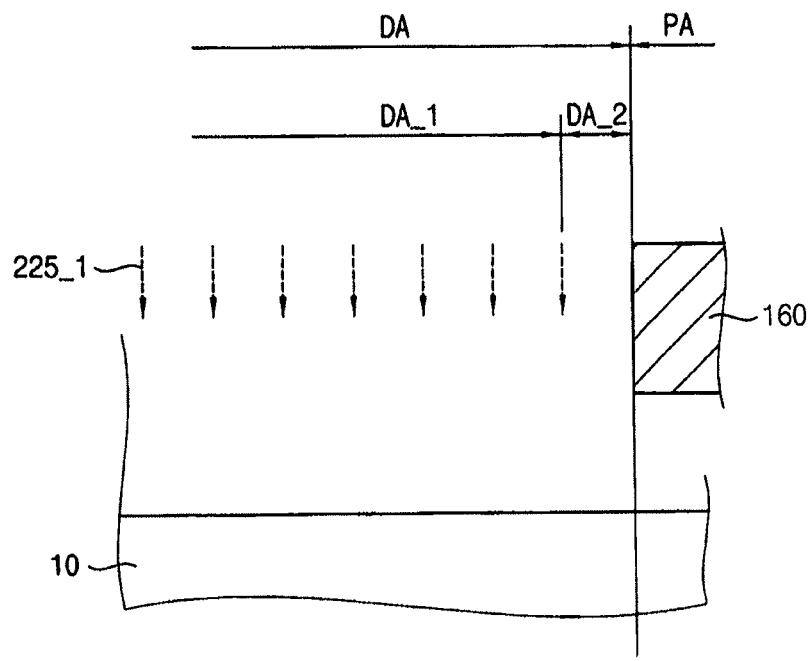
FIGS. 5 and 7 to 10 illustrate cross-sectional views depicting stages of a method of manufacturing the optical film assembly of FIG. 4.
Figure 6A:
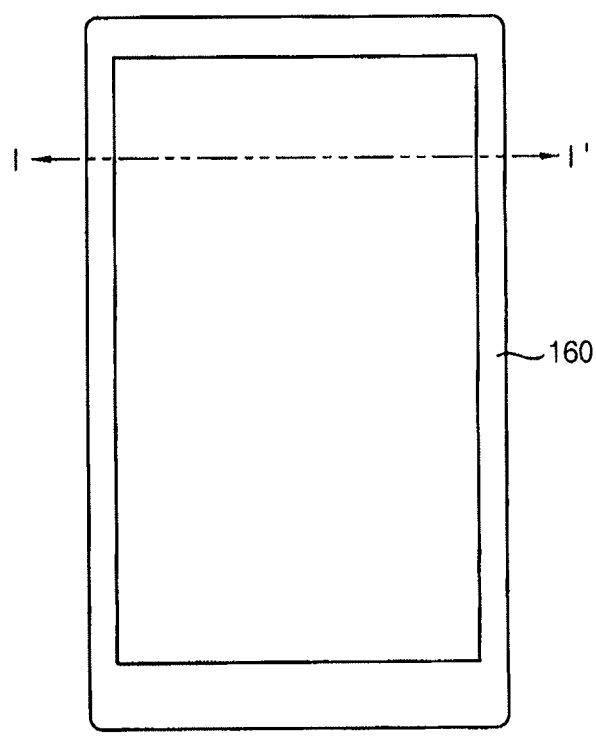
FIG. 6A illustrates a plan view depicting a mask of FIG. 5.
Figure 6B:
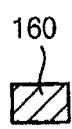
FIG. 6B illustrates a cross-sectional view taken along a line I-I' of FIG. 6A.

FIG. 5 illustrates a cross-sectional view depicting forming a first anti-reflection layer on the display panel of FIG. 4.
FIG. 6A illustrates a plan view illustrating a mask of FIG. 5.
FIG. 6B illustrates a cross-sectional view taken along a line I-I' of FIG. 6A.

Figure 6B:

Referring to FIGS. 5 to 6B, a mask 160 may be aligned over the display panel 10. The mask 160 may be adjacent to the peripheral region PA of the display panel 10. In other implementations, the mask 160 may make contact with the peripheral region PA of the display panel 10.

In the present example embodiment, first atoms 225_1 having a predetermined refractivity may be deposited on the upper surface of the display panel 10 through the mask 160. For example, the first atoms 225_1 may be deposited through physical vapor deposition (PVD). For example, the first atoms 225_1 may form the first anti-refraction layer 220_1 through E-beam deposition. In other implementations, the first atoms 225_1 may be deposited through a sputtering method, a chemical vapor deposition, a pulse laser deposition, a vacuum deposition, an atomic layer deposition, etc.

Figure 7:
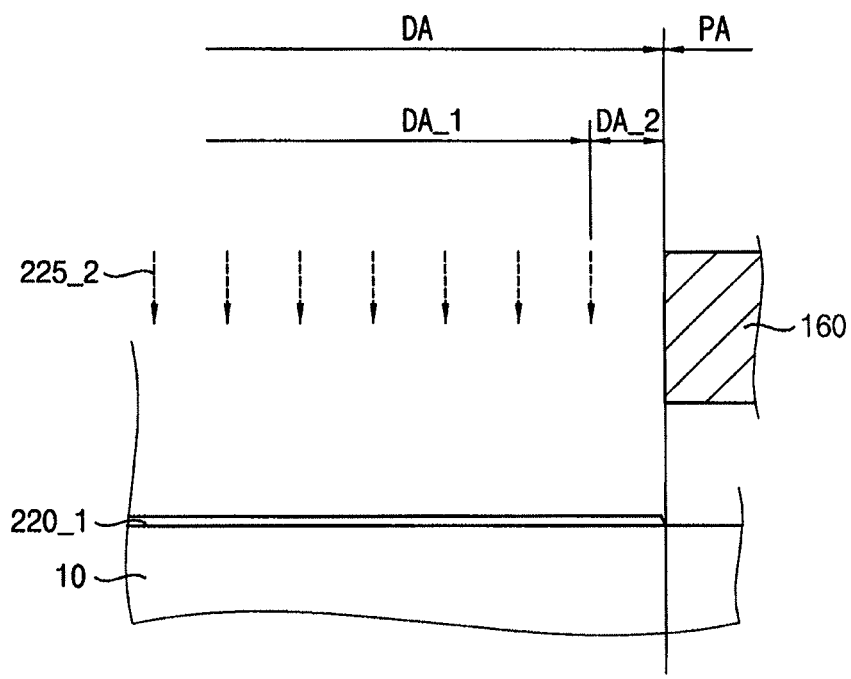

FIG. 7 illustrates a cross-sectional view depicting forming a second anti-reflection layer on the first anti-reflection layer of FIG. 5.

In the present example, an inner surface of the mask 160 may be substantially perpendicular to the upper surface of the display panel 10. When the inner surface of the mask 160 is substantially perpendicular to the upper surface of the display panel 10, a portion of the first atoms 225_1 adjacent to the inner surface of the mask 160 may be injected toward the upper surface of the display panel 10, and may collide with the inner surface of the mask 160. The portion of the first atoms 225_1 that collide with the inner surface of the mask 160 may be deposited in a portion of the interface region DA_2 that is spaced apart from the boundary between the interface region DA_2 and the peripheral region PA. Thus, the side surface of the deposited first anti-reflection layer 220_1 (shown in FIG. 7) may be inclined with respect to the upper surface of the display panel 10. In other implementations, the inner surface of the mask may be inclined toward the peripheral region PA. When the inner surface of the mask is inclined toward the peripheral region PA, the atoms may be deposited adjacent to the boundary between the interface region DA_2 and the peripheral region PA although the atoms may collide with the inner surface of the mask. Thus, the side surface of the first anti-reflection layer may be substantially perpendicular to the upper surface of the display panel 10.

Second atoms (not shown) may be deposited on the first anti-reflection layer 220_1 using the mask 160 to form the second anti-reflection layer 220_2. In the present example embodiment, the second atoms (not shown) may be a different material from the first atoms 225_1 (shown in FIG. 5). For example, the first atoms (225_1 of FIG. 5) may provide magnesium fluoride ($MgF_2$), silicon oxide ($SiO_2$), etc., that has the low refractivity. The second atoms (not shown) may provide titanium oxide ($TiO_2$) having the high refractivity.

Figure 8:
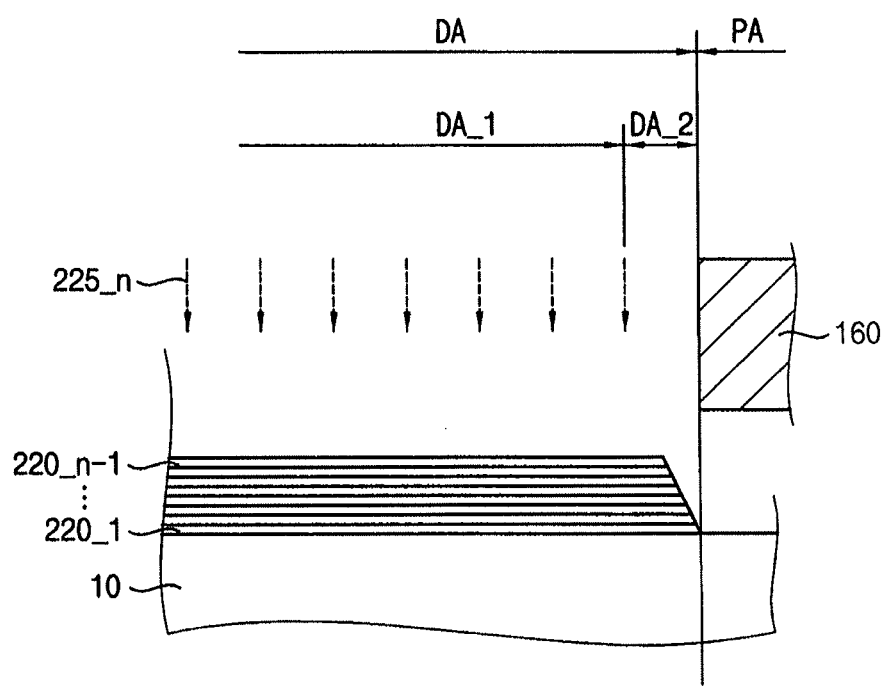

FIG. 8 illustrates a cross-sectional view depicting third to (n−1)-th anti-reflection layers on the second anti-reflection layer of FIG. 7.

The third to (n−1)-th anti-reflection layers 220_3, . . . 220_$n$ may be sequentially deposited on the second anti-reflection layer 220_2 using the mask 160. The method of forming the third to (n−1)-th anti-reflection layers 220_3, . . . 220_$n$−1 may be substantially the same as that of the first and second anti-reflection layers 220_1 and 220_2. In the present example embodiment, the first to (n−1)-th anti-reflection layers 220_1, . . . 220_$n$−1 may include the high refractive layers and the low refractive layers that are alternately arranged.

n-th atoms 225_*n* may be deposited on the (n−1)-th anti-reflection layer 220_*n*−1 using the mask 160. Thus, the anti-reflection film 220 may be formed on the display panel.

Figure 9:
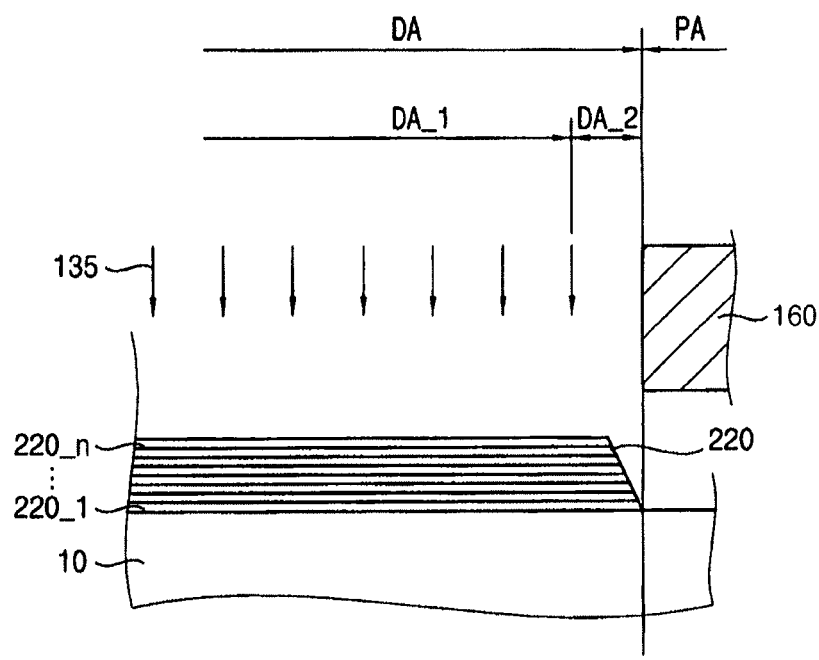

FIG. 9 illustrates a cross-sectional view depicting forming the anti-fingerprint film on the anti-reflection film of FIG. 8.

Referring to FIG. 9, the hydrophobic material 135 may be deposited on the anti-reflection film 220 using the mask 160.

In the present example embodiment, the inner surface of the mask 160 may be substantially perpendicular to the upper surface of the anti-reflection film 220. When the inner surface of the mask 160 is substantially perpendicular to the upper surface of the anti-reflection film 220, a portion of the hydrophobic material 135 adjacent to the inner surface of the mask 160 may be injected toward the upper surface of the anti-reflection film 220, and may collide with the inner surface of the mask 160. The portion of the hydrophobic material 135 that collides with the inner surface of the mask 160 may be deposited in the interface region DA_2 that is spaced apart from the boundary between the interface region DA_2 and the peripheral region PA.

Figure 10:
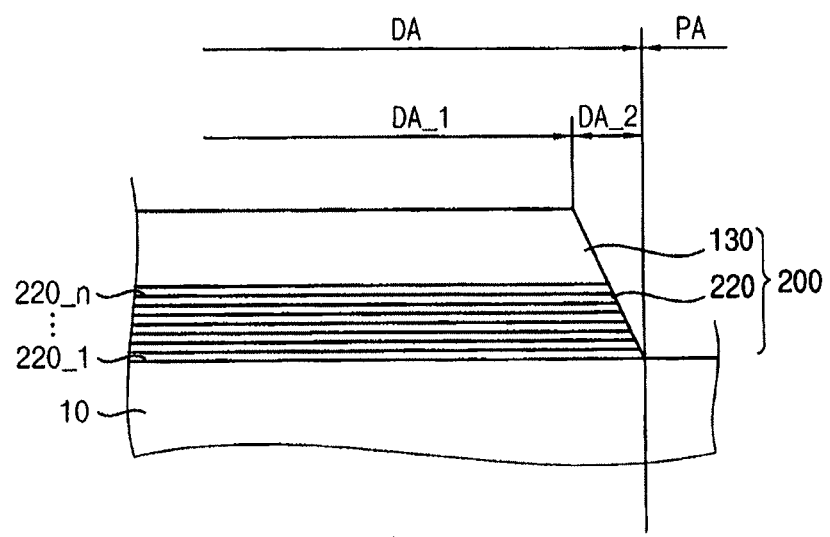

FIG. 10 illustrates a cross-sectional view depicting the optical film assembly on the display panel of FIG. 9.

Referring to FIG. 10, the side surface of the deposited anti-fingerprint film 130 may be inclined with respect to the upper surface of the anti-reflection film 220. In the present example, the upper surface of the anti-fingerprint film 130 is extended toward the display region DA_1 and the interface region DA_2.

Figure 11:
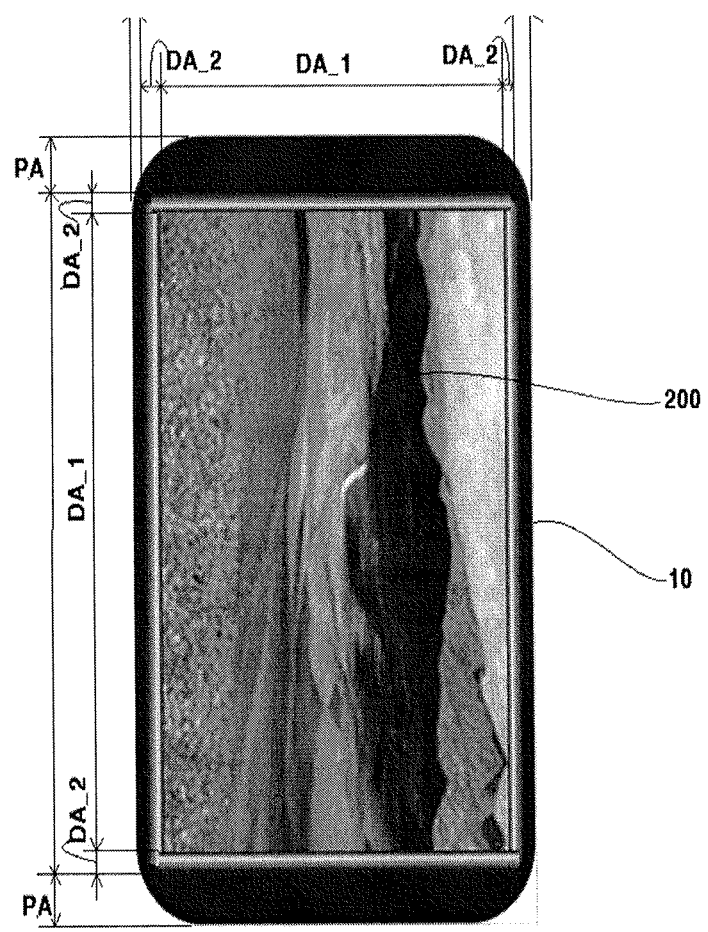
FIG. 11 illustrates an image depicting a display apparatus including the optical film assembly of FIG. 4.

FIG. 11 illustrates an image depicting a display apparatus including the optical film assembly of FIG. 4.

Referring to FIG. 11, the optical film assembly 200 is not disposed in the peripheral region PA of the display panel 10.

The optical film assembly 200 is disposed in the display region DA_1 and the interface region DA_2.

Referring to FIGS. 4 and 11, an upper surface of a portion of the optical film assembly 200, which is disposed in the display region DA_1, is substantially parallel with the upper surface of the display panel 10. The image is displayed in the display region DA_1.

A side surface of a portion of the optical film assembly 200, which is disposed in the interface region DA_2, is inclined with respect to the upper surface of the display panel 10. The anti-reflection film 220 of the optical film assembly 200 includes the anti-reflection layers 220_1, . . . 220_*n* that prevent the reflection of light having the different wavelengths. When the side surface of the anti-reflection film 220 is inclined with respect to the upper surface of the display panel 10, only a portion of the anti-reflection layers 220_1, . . . 220_*n* of the anti-reflection film 220 is disposed in the interface region DA_2.

When only the portion of the anti-reflection layers 220_1, . . . 220_*n* of the anti-reflection film 220 is disposed in the interface region DA_2, a portion of the external light that corresponds to omitted anti-reflection layers corresponding to a predetermined wavelength, may not be subject to destructive interference such that light having a predetermined color corresponding to the predetermined wavelength may be reflected from the anti-reflection film 220 in the interface region DA_2. In the present example embodiment, the number of the omitted anti-reflection layers may increase as a distance from an inner boundary of the interface region DA_2 increases. Thus, the portion of the anti-reflection film 220 in the interface region DA_2 may display an image of gradually changing colors. For example, the anti-reflection film 220 in the interface region DA_2 may display a rainbow-type image.

According to the present example embodiment, the anti-reflection film 220 may be the multi-layered type, such that reflectivity of the anti-reflection film 220 may be increased.

Figure 12:
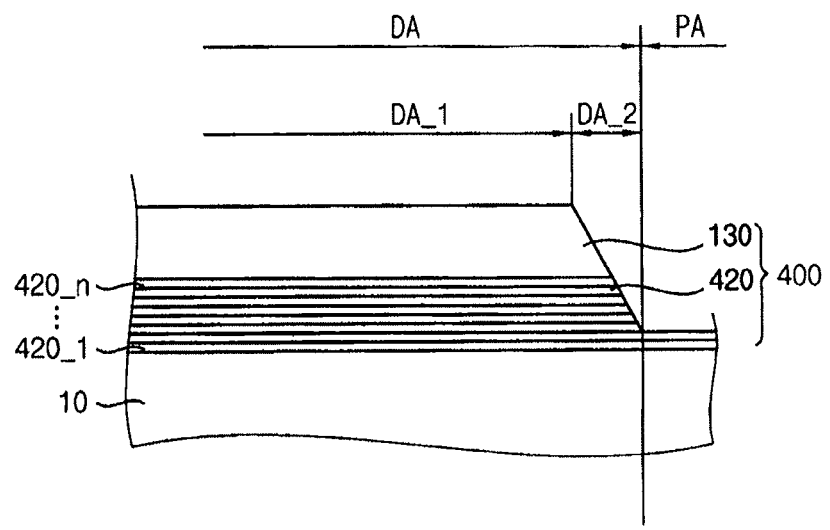
FIG. 12 illustrates a cross-sectional view depicting an optical film assembly according to another example embodiment.

FIG. 12 illustrates a cross-sectional view depicting an optical film assembly according to another example embodiment. The optical film assembly of FIG. 12 may be substantially the same as the optical film assembly of FIGS. 4 to 11 except for details relating to the anti-reflection film. Thus, any description regarding the same elements will not be repeated.

Referring to FIG. 12, the display apparatus may include a display panel 10 and an optical film assembly 400.

The display panel 10 may have an internal region DA and a peripheral region PA. The internal region DA may be disposed in the display panel 10. The peripheral region PA may surround the internal region DA. The internal region DA may include a display region DA_1 and an interface region DA_2 that surrounds the display region DA_1.

The optical film assembly 400 may be disposed on the display panel 10. In the present example embodiment, the optical film assembly 400 may only be disposed in the internal region DA of the display panel 10, except as further described below.

The optical film assembly 400 includes an anti-reflection film 420 and an anti-fingerprint film 130.

The anti-reflection film 420 may be disposed on the display panel 10 to prevent the reflection of an external light. In the present example embodiment, the anti-reflection film 420 may be integrally formed onto an upper surface of the display panel 10.

A lower surface of the anti-reflection film 420 may be disposed in the internal region DA and the peripheral region PA. For example, a portion of the anti-reflection film 420 may be disposed in the internal region DA and the peripheral region PA, and a remaining portion of the anti-reflection film 420 may be disposed only in the internal region DA. For example, first and second anti-reflection layers 420_1 and 420_2 of the anti-reflection film 420 may be disposed in the internal region DA and the peripheral region PA, and third to n-th anti-reflection layers 420_3, . . . 420_*n* may be disposed only in the internal region DA. The side surface of the third to n-th anti-reflection layers 420_3, . . . 420_*n* of the anti-reflection film 420 is inclined with respect to an upper surface of the display panel 10. In the present example embodiment, the lower surface of the third anti-reflection layer 420_3 may correspond to a boundary between the internal region DA and the peripheral region PA. The inclined side surface of the third to n-th anti-reflection layers 420_3, . . . 420_*n* may be disposed in the interface region DA_2 of the internal region DA.

The anti-reflection film 420 may be a multi-layer type. For example, the anti-reflection film 420 includes the first to n-th refractive layers 420_1, . . . 420_*n* having different refractivities.

A portion of an external light reflected from a lower surface of each of the refractive layers 420_1, . . . 420_*n* may have a phase delayed by a half wavelength with respect to another portion of the external light reflected from an upper surface of each of the refractive layers 420_1, . . . 420_*n*. The portions of reflected light having the phase difference of the half wavelength may overlap so that the overlapped light may not be viewable to a user because of destructive interference.

The side surface of the third to n-th refractive layers 420_3, . . . 420_*n* may be inclined with respect to the upper surface of the display panel 10 in the interface region DA_2. When the side surface of the third to n-th refractive layers 420_3, ... 420_n is inclined, a periphery of the anti-reflection film 420 disposed in the interface region DA_2 may only includes a portion of the anti-refraction layers 420_3, ... 420_n.

When the periphery of the anti-reflection film 420 includes only a portion of the anti-reflection layers 420_3, ... 420_n, a portion of the external light that corresponds to omitted anti-reflection layers corresponding to a predetermined wavelength, may not be destructively interfered so that the light having a predetermined color corresponding to the predetermined wavelength may be reflected from the anti-reflection film 420 in the interface region DA_2. In the present example embodiment, the number of the omitted anti-reflection layers may increase as a distance from an inner boundary of the interface region DA_2 increases. Thus, the portion of the anti-reflection film 420 in the interface region DA_2 may display an image of gradually changing colors.

The first and second anti-reflection layers 420_1 and 420_2 may be aligned substantially parallel with the upper surface of the display panel 10 in the peripheral region PA. Each of the first and second anti-reflection layers 420_1 and 420_2 may destructively compensate the light having the wavelength corresponding to each of the first and second anti-reflection layers 420_1 and 420_2. The remainder of the light except the destructively compensated light corresponding to the first and second anti-reflection layers 420_1 and 420_2 may be reflected from the peripheral region PA to display a predetermined hue. For example, the remainder of the light, which is reflected from the peripheral region PA, may displays a bluish light.

The anti-fingerprint film 130 may be disposed on the anti-reflection film 420 to prevent external pollutants from being attached to the optical film assembly 400. The inclined side surface of the anti-fingerprint film 130 may be disposed in the internal region DA and the interface region DA_2.

FIGS. 13 to 17 illustrate cross-sectional views depicting stages of a method of manufacturing the optical film assembly of FIG. 12.

Figure 13:
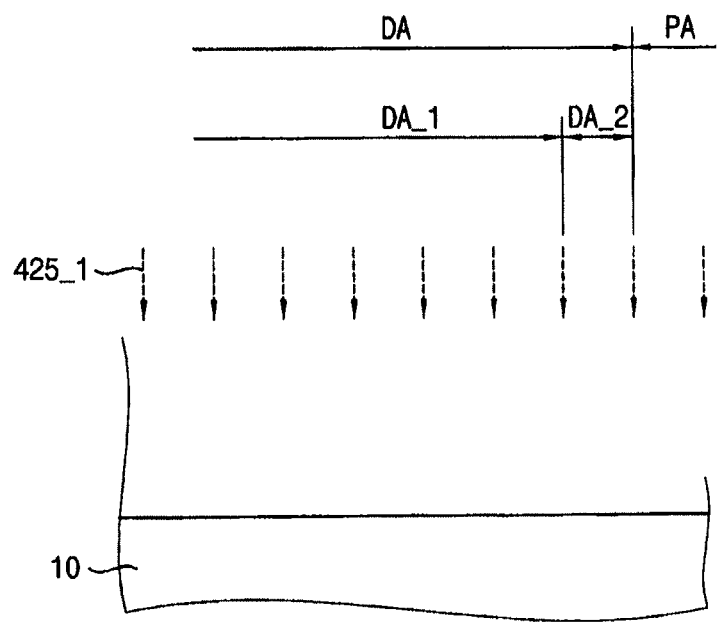
FIGS. 13 to 17 illustrate cross-sectional views depicting stages of a method of manufacturing the optical film assembly of FIG. 12.

FIG. 13 illustrates a cross-sectional view depicting forming a first anti-reflection layer on the display panel of FIG. 4.

Figure 14:
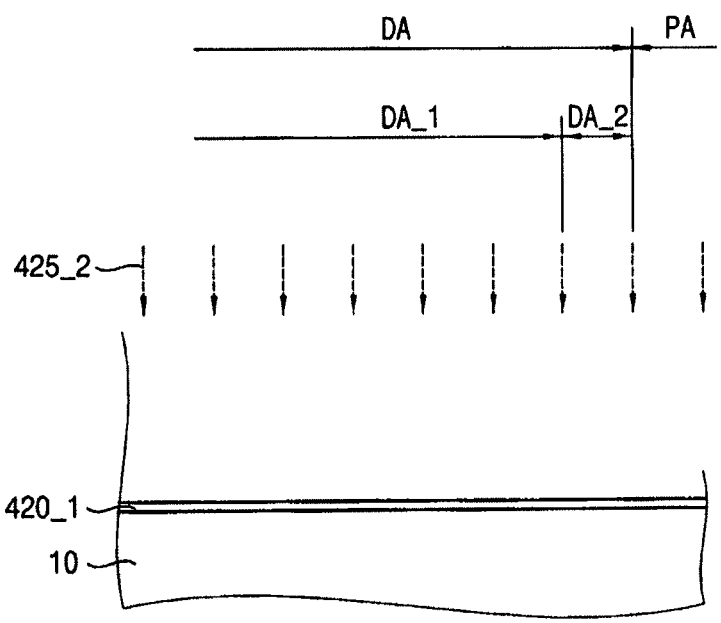

Referring to FIG. 13, first atoms 425_1 may be deposited on the upper surface of the display panel 10 to form the first anti-reflection layer 420_1 (shown in FIG. 14). In the present example embodiment, the first atoms 425_1 may be deposited in the internal region DA and the peripheral region PA of the display panel 10 at a uniform thickness. For example, the first atoms 425_1 may be deposited through a physical vapor deposition (PVD). The first atoms 225_1 may form the first anti-refraction layer 220_1 through an E-beam deposition. In other implementations, the first atoms 225_1 may be deposited through a sputtering method, a chemical vapor deposition, a pulse laser deposition, a vacuum deposition, an atomic layer deposition, etc.

FIG. 14 illustrates a cross-sectional view depicting forming a second anti-reflection layer on the first anti-reflection layer of FIG. 13.

Figure 15:
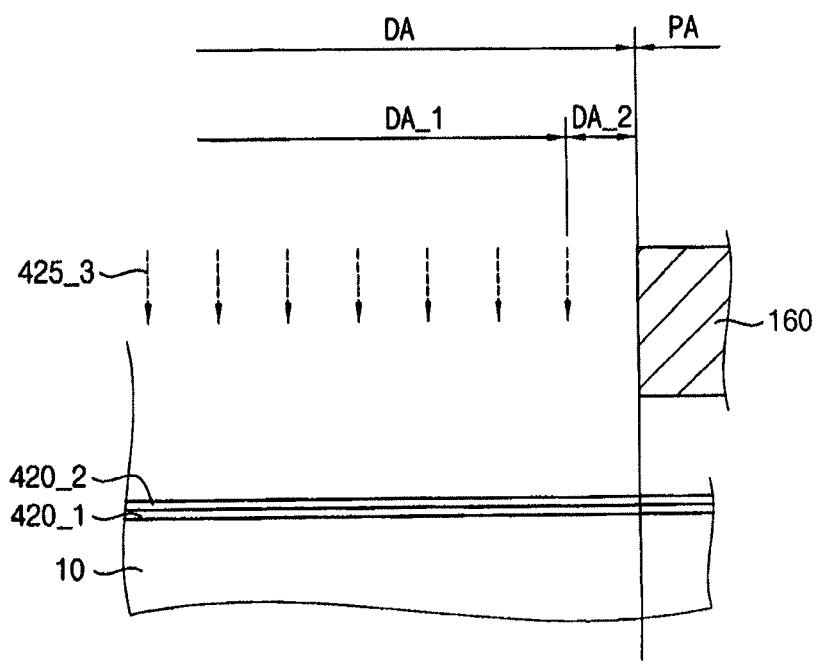

Referring to FIG. 14, second atoms 425_2 may be deposited on the first anti-reflection layer 420_1 without any mask to form the second anti-reflection layer 420_2 (shown in FIG. 15). In the present example embodiment, the second atoms 425_2 may be deposited in the internal region DA and the peripheral region PA at a uniform thickness. In the present example, the second atoms 425_2 may be a different material from the first atoms 425_1 (shown in FIG. 13). For example, the first atoms 425_1 (shown in FIG. 13) may provide a low refractive material such as magnesium fluoride ($MgF_2$), silicon oxide ($SiO_2$), etc., and the second atoms 425_2 may provide a high refractive material such as titanium oxide ($TiO_2$), etc.

FIG. 15 illustrates a cross-sectional view depicting forming the third anti-reflection layer on the second anti-reflection layer of FIG. 14.

Figure 16:
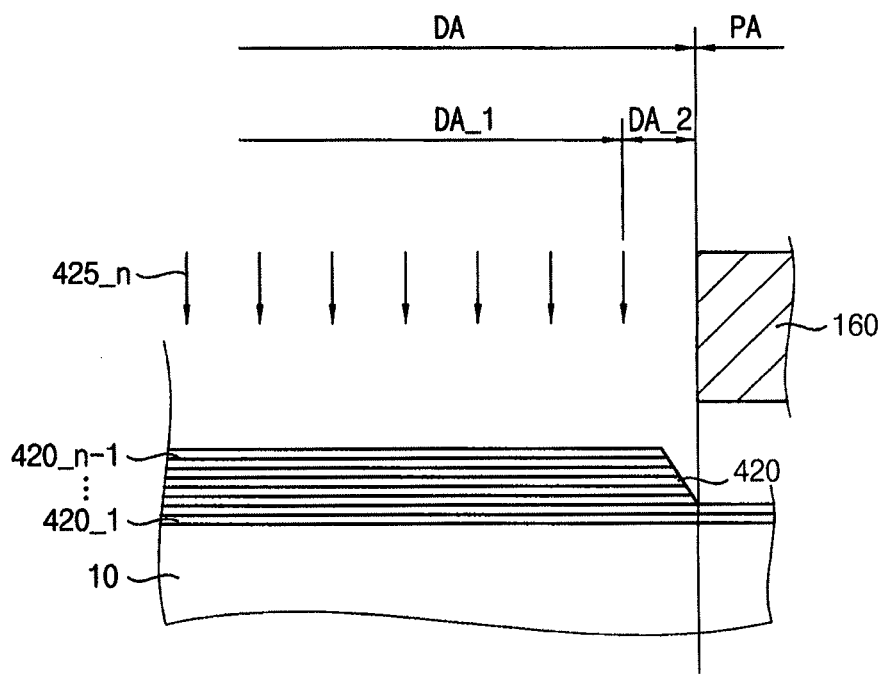

Referring to FIG. 14, third atoms 425_3 may be deposited on the second anti-reflection layer 420_2 using a mask 160 to form the third anti-reflection layer 420_3 (shown in FIG. 16). An inner surface of the mask 160 may be substantially perpendicular to the upper surface of the second anti-reflection layer 420_2. When the inner surface of the mask 160 is substantially perpendicular to the upper surface of the second anti-reflection layer 420_2, a portion of the third atoms 425_3 adjacent to the inner surface of the mask 160 may be injected toward the upper surface of the second anti-reflection layer 420_2, and may collide with the inner surface of the mask 160. The portion of the third atoms 425_3 that collide with the inner surface of the mask 160 may be deposited in the interface region DA_2 that is spaced apart from the boundary between the interface region DA_2 and the peripheral region PA. Thus, the side surface of the deposited third anti-reflection layer 420_3 (shown in FIG. 16) may be inclined with respect to the upper surface of the second anti-reflection layer 420_2.

FIG. 16 illustrates a cross-sectional view depicting fourth to (n−1)-th anti-reflection layers on the third anti-reflection layer of FIG. 15.

Referring to FIG. 16, the third anti-reflection layer 420_3 may be disposed only in the internal region DA, and not disposed in the peripheral region PA. In the present example embodiment, a lower periphery of the third anti-reflection layer 420_3 may correspond to a boundary between the internal region DA and the peripheral region PA.

The fourth to (n−1)-th atoms (not shown) may be deposited on the third anti-reflection layer 420_3 using the mask 160 to sequentially form the fourth to (n−1)-th anti-reflection layers 420_4, ... 420_n. The method of forming the fourth to (n−1)-th anti-reflection layers 420_4, ... 420_n−1 are substantially the same as the method of forming the third anti-reflection layer 420_3. In the present example embodiment, the first to (n−1)-th anti-reflection layers 420_1, ... 420_n−1 may include the high refractive layers and the low refractive layers that are alternately arranged.

n-th atoms 425_n may be deposited on the (n−1)-th anti-reflection layer 420_n−1 using the mask 160. Thus, the anti-reflection film 420 may be formed on the display panel 10.

FIG. 16 illustrates a cross-sectional view depicting forming the anti-fingerprint film on the anti-reflection film of FIG. 15.

Referring to FIG. 16, the hydrophobic material 135 may be deposited on the anti-reflection film 420 using the mask 160.

In the present example embodiment, the inner surface of the mask 160 may be substantially perpendicular to the upper surface of the anti-reflection film 420. When the inner surface of the mask 160 is substantially perpendicular to the upper surface of the anti-reflection film 420, a portion of the hydrophobic material 135 adjacent to the inner surface of the mask 160 may be injected toward the upper surface of the anti-reflection film 420, and may collide with the inner surface of the mask 160. The portion of the hydrophobic material 135 that collides with the inner surface of the mask 160 may be deposited in the interface region DA_2 that is spaced apart from the boundary between the interface region DA_2 and the peripheral region PA.

Figure 17:
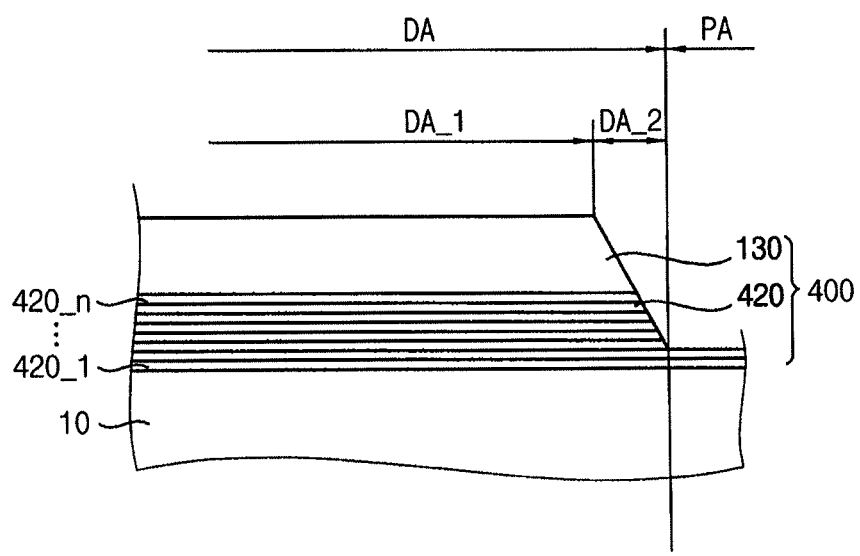

FIG. 17 illustrates a cross-sectional view depicting the optical film assembly on the display panel of FIG. 16.

Referring to FIG. 17, the side surface of the deposited anti-fingerprint film 130 may be inclined with respect to the upper surface of the anti-reflection film 420. In the present example, the upper surface of the anti-fingerprint film 130 may extend toward the display region DA_1 and the interface region DA_2.

Figure 18:
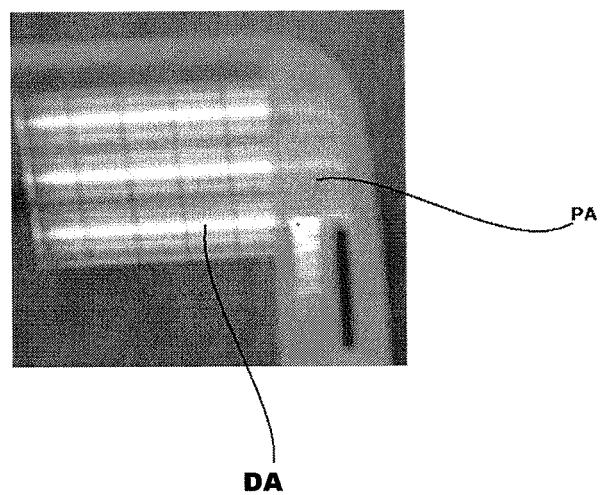
FIG. 18 illustrates an image depicting the optical film assembly of FIG. 12.

FIG. 18 illustrates an image depicting the optical film assembly of FIG. 12.

Referring to FIG. 18, a portion of the external light that is reflected from the internal region DA may have different hue from a portion of the external light that is reflected from the peripheral region PA.

According to the present example embodiment, the portion of the anti-reflection film 420 extends toward the peripheral region PA so that the peripheral region PA has the predetermined hue, thereby improving beauty.

Figure 19:
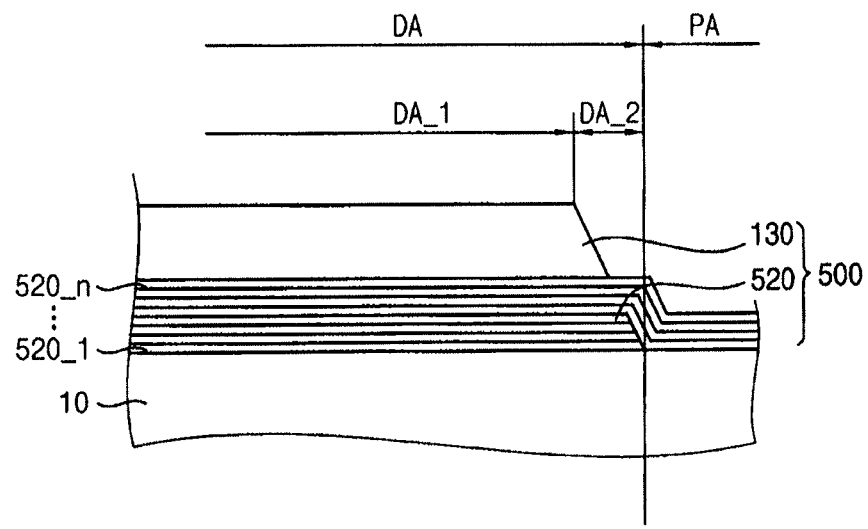
FIG. 19 illustrates a cross-sectional view depicting an optical film assembly according to another example embodiment.

FIG. 19 illustrates a cross-sectional view depicting an optical film assembly according to another example embodiment. The optical film assembly of FIG. 19 is substantially the same as the optical film assembly of FIGS. 4 to 11 except for the structure of the anti-reflection film. Thus, descriptions concerning the same elements will not be repeated.

Referring to FIG. 19, the display apparatus may include a display panel 10 and an optical film assembly 500.

The display panel 10 may have an internal region DA and a peripheral region PA. The internal region DA may be disposed in the display panel 10. The peripheral region PA may surround the internal region DA. The internal region DA may include a display region DA_1 and an interface region DA_2 that surrounds the display region DA_1.

The optical film assembly 500 may be disposed on the display panel 10. In the present example embodiment, the optical film assembly 500 may only be disposed in the internal region DA of the display panel 10, except as described below.

The optical film assembly 500 may include an anti-reflection film 520 and an anti-fingerprint film 130.

The anti-reflection film 520 may be disposed on the display panel 10 to prevent the reflection of an external light. In the present example embodiment, the anti-reflection film 520 may have different thicknesses in the internal region DA and the peripheral region PA.

A lower surface of the anti-reflection film 520 may be disposed in the internal region DA and the peripheral region PA. For example, a portion of the anti-reflection film 520 may be disposed in the internal region DA and the peripheral region PA, and a remaining portion of the anti-reflection film 520 is disposed only in the internal region DA. For example, a first to (n−3)-th anti-reflection layers 520_1, . . . 520_$n$−3 of the anti-reflection film 520 may be disposed only in the internal region DA, and (n−2)-th to n-th anti-reflection layers 520_$n$−2, . . . 520_$n$ are disposed in the internal region DA and the peripheral region PA. Side surface of the first to (n−3)-th anti-reflection layers 520_1, . . . 520_$n$−3 of the anti-reflection film 520 may be inclined with respect to an upper surface of the display panel 10. In the present example embodiment, the lower surface of the first anti-reflection layer 520_1 corresponds to a boundary between the internal region DA and the peripheral region PA. The inclined side surface of the (n−2)-th to n-th anti-reflection layers 520_$n$−2, . . . 520_$n$ may be disposed from the interface region DA_2 toward the peripheral region PA.

In the present example embodiment, the anti-reflection film 520 may be a multi-layer type. For example, the anti-reflection film 520 may include the first to n-th refractive layers 520_1, . . . 520_$n$ having different refractivities.

A portion of an external light reflected from a lower surface of each of the refractive layers 520_1, . . . 520_$n$ may have a phase delayed by a half wavelength with respect to another portion of the external light reflected from an upper surface of each of the refractive layers 520_1, . . . 520_$n$. The portions of light having the phase difference of the half wavelength may overlap in the display region DA_1 such that the overlapped lights may not be viewable to a user because of destructive interference.

The side surface of the first to (n−3)-th refractive layers 520_1, . . . 520_(n−3) may be inclined with respect to the upper surface of the display panel 10 in the interface region DA_2. When the side surface of the first to (n−3)-th refractive layers 520_1, . . . 520_(n−3) is inclined, a periphery of the anti-reflection film 520 disposed in the interface region DA_2 only includes a portion of the anti-refraction layers 520_1, . . . 520_$n$−3.

When the periphery of the anti-reflection film 520 includes only a portion of the anti-reflection layers 520_1, . . . 520_$n$−3, a portion of the external light that corresponds to omitted anti-reflection layers corresponding to a predetermined wavelength, may not be destructively interfered so that the light having a predetermined color corresponding to the predetermined wavelength is reflected from the anti-reflection film 520 in the interface region DA_2. In the present example embodiment, the number of the omitted anti-reflection layers increases as a distance from an inner boundary of the interface region DA_2 increases. Thus, the portion of the anti-reflection film 520 in the interface region DA_2 may display gradually changing colors.

The (n−2)-th to n-th anti-reflection layers 520_$n$−2 to 520_$n$ may be aligned substantially parallel with the upper surface of the display panel 10 in the peripheral region PA. Each of the (n−2)-th to n-th anti-reflection layers 520_$n$−2 to 520_$n$ may destructively compensate the light having the wavelength corresponding to each of the (n−2)-th to n-th anti-reflection layers 520_$n$−2 to 520_$n$. The remainder of the light, except for the destructively compensated light corresponding to the (n−2)-th to n-th anti-reflection layers 520_$n$−2 to 520_$n$, may be reflected from the peripheral region PA to display an image having a predetermined hue. For example, the remainder of the light, which is reflected from the peripheral region PA, may display a reddish light.

The anti-fingerprint film 130 may be disposed on the anti-reflection film 520 to prevent externally provided pollutants from being attached to the optical film assembly 500. The inclined side surface of the anti-fingerprint film 130 may be disposed in the internal region DA and the interface region DA_2.

FIGS. 20 to 25 illustrate cross-sectional views depicting stages of a method of manufacturing the optical film assembly of FIG. 19.

Figure 20:
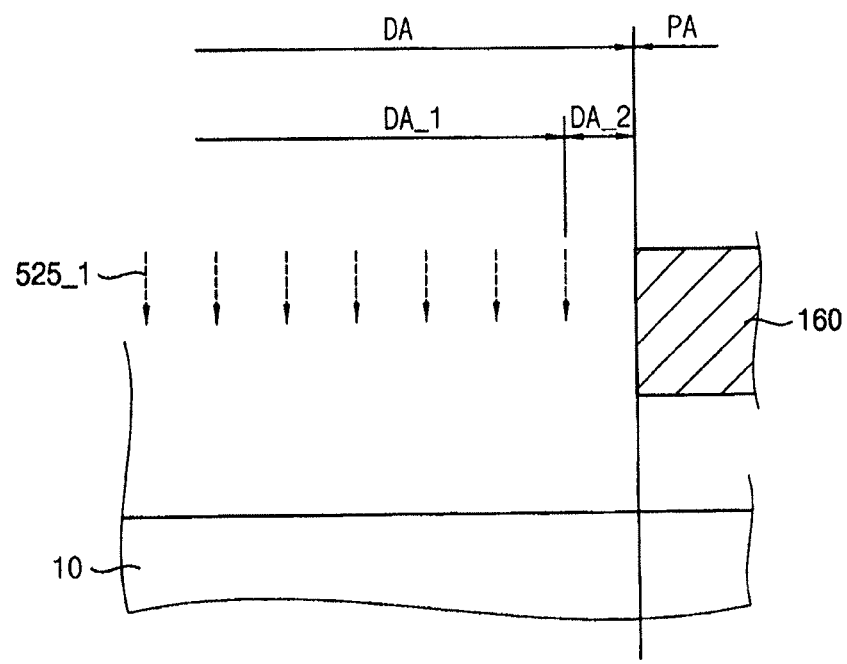
FIGS. 20 to 25 illustrate cross-sectional views depicting stages of a method of manufacturing the optical film assembly of FIG. 19.

FIG. 20 illustrates a cross-sectional view depicting forming a first anti-reflection layer on the display panel of FIG. 19.

Referring to FIG. 20, a mask 160 may be aligned on the display panel 10. The mask 160 may be disposed in the peripheral region PA of the display panel 10. In other implementations, the mask 160 may make contact with the peripheral region PA of the display panel 10.

Figure 21:
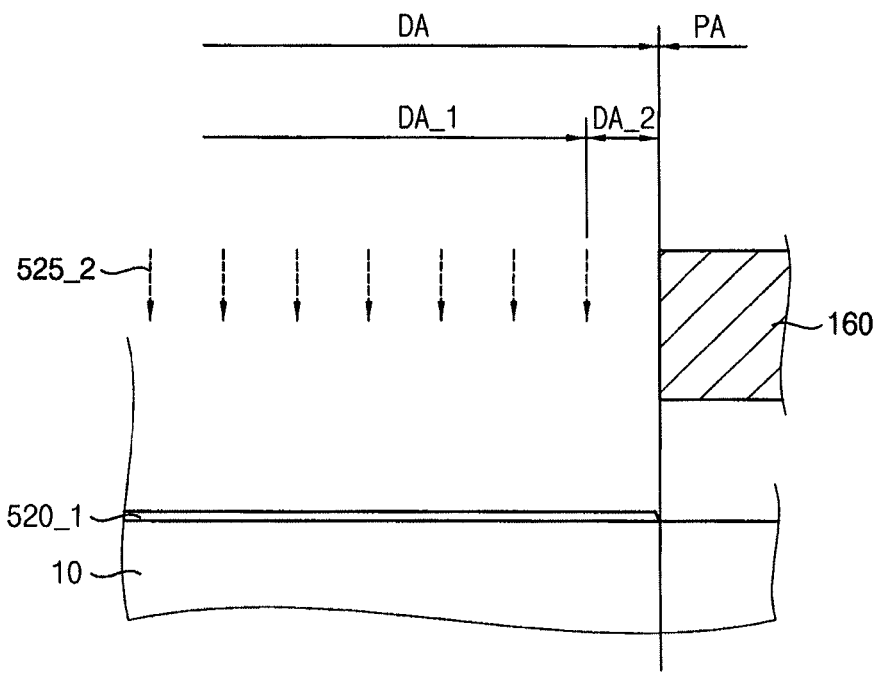

In the present example embodiment, first atoms 525_1 may be deposited on the upper surface of the display panel 10 through the mask 160 to form the first anti-reflection layer 520_1 (shown in FIG. 21). For example, the first atoms 525_1 may be deposited through physical vapor deposition (PVD). For example, the first atoms 525_1 may form the first anti-refraction layer 520_1 through E-beam deposition. In other implementations, the first atoms 525_1 may be deposited through a sputtering method, a chemical vapor deposition, a pulse laser deposition, a vacuum deposition, an atomic layer deposition, etc.

FIG. 21 illustrates a cross-sectional view depicting forming a second anti-reflection layer on the first anti-reflection layer of FIG. 20.

Figure 22:
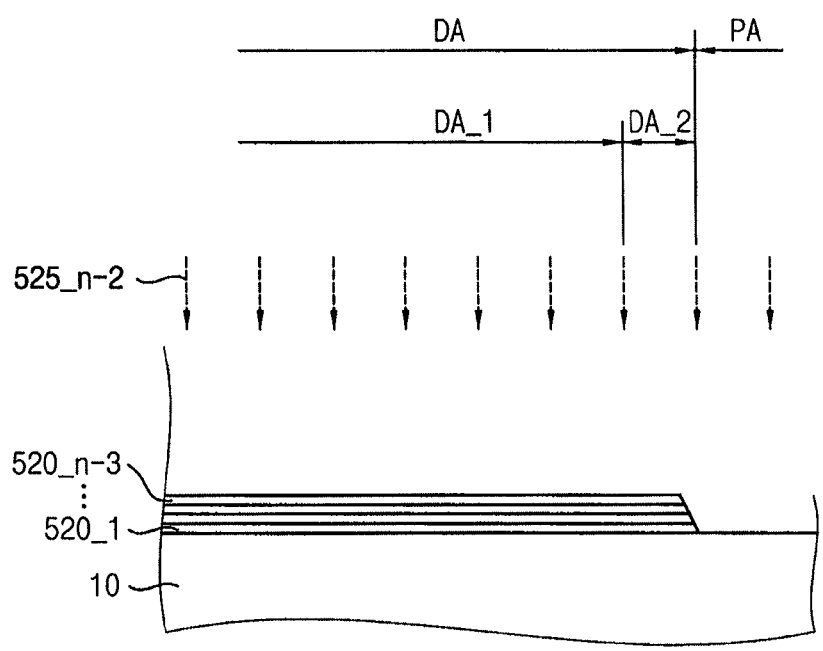

Referring to FIG. 21, second atoms 525_2 are deposited on the first anti-reflection layer 520_1 through the mask 160 to form the second anti-reflection layer 520_2 (shown in FIG. 22). In the present example embodiment, the inner surface of the mask 160 may be substantially perpendicular to the upper surface of the display panel 10. In the present example, the second atoms 525_2 may be of a different material from the first atoms 525_1 (shown in FIG. 20).

FIG. 21 illustrates a cross-sectional view depicting forming the third to (n-3)-th anti-reflection layers on the second anti-reflection layer of FIG. 21.

Referring to FIG. 21, the third to (n-3)-th anti-reflection layers 520_3, . . . 520_n-3 may be sequentially deposited on the second anti-reflection layer 520_2. The method of forming the third to (n-3)-th anti-reflection layers 520_3, . . . 520_n-3 may be substantially the same as the method of forming the first and second anti-reflection layers 520_1 and 520_2. Thus, description concerning the above-mentioned method will not be repeated. In the present example embodiments, the third to (n-3)-th anti-reflection layers 520_3, . . . 520_n-3 may include low refractive layers and high refractive layers that are alternately arranged each other.

Figure 23:
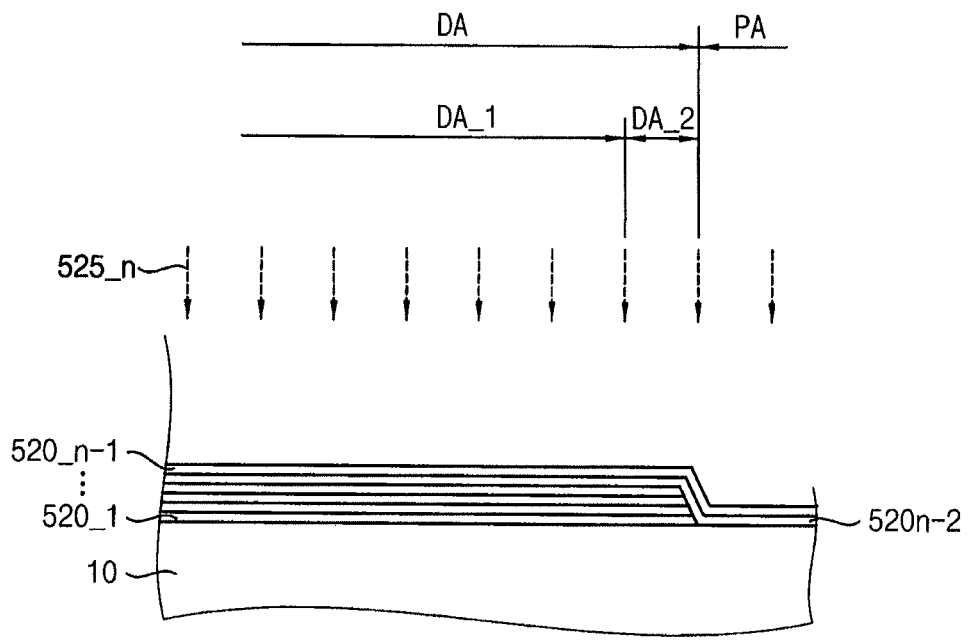

FIGS. 22 and 23 illustrate a cross-sectional view depicting forming (n-2)-th to n-th anti-reflection layers on the (n-3)-th anti-reflection layer illustrated in FIG. 22.

Referring to FIGS. 22 and 23, (n-2)-th atoms 525_n-2 may be deposited on the (n-3)-th anti-reflection layers 520_n-3 without using a mask to form the (n-2)-th anti-reflection layer 520_n-2. In the present example embodiment, the (n-2)-th atoms 525_n-2 may be deposited at a uniform thickness in the internal region DA and the peripheral region PA of the display panel 10 on which the first to (n-3)-th anti-reflection layers 520_1, . . . 520_n-3 are formed.

Figure 24:
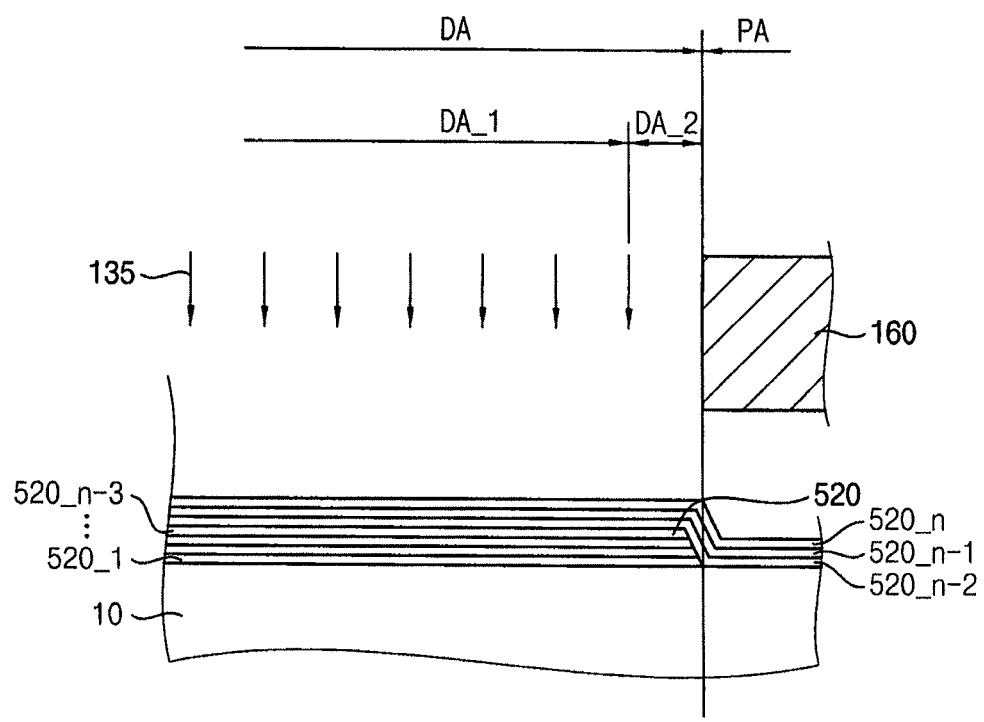

(n-1)-th atoms (not shown) may be deposited on the (n-2)-th anti-reflection layers 520_n-2 without any mask to form the (n-1)-th anti-reflection layer 520_n-1. In the present example embodiment, the (n-1)-th atoms (not shown) may be deposited at a uniform thickness in the internal region DA and the peripheral region PA of the display panel 10 on which the first to (n-2)-th anti-reflection layers 520_1, . . . 520_n-2.

n-th atoms 525_n may be deposited on the (n-1)-th anti-reflection layer 520_n-1 without any mask to form the n-th anti-reflection layer 520_n (shown in FIG. 24). In the present example embodiment, the n-th atoms 525_n may be deposited at a uniform thickness in the internal region DA and the peripheral region PA of the display panel 10 on which the first to (n-1)-th anti-reflection layers 520_1, . . . 520_n-1. Thus, the anti-reflection film 520 (shown in FIG. 24) may be formed on the display panel 10.

FIG. 24 illustrates a cross-sectional view depicting forming the anti-fingerprint film on the anti-reflection film of FIG. 23.

Referring to FIG. 24, the hydrophobic material 135 may be deposited on the anti-reflection film 520 using the mask 160.

In the present example embodiment, the inner surface of the mask 160 may be substantially perpendicular to the upper surface of the anti-reflection film 520. The hydrophobic material 135 may be spaced apart from the boundary between the interface region DA_2 and the peripheral region PA and may be deposited in the interface region DA_2.

Figure 25:
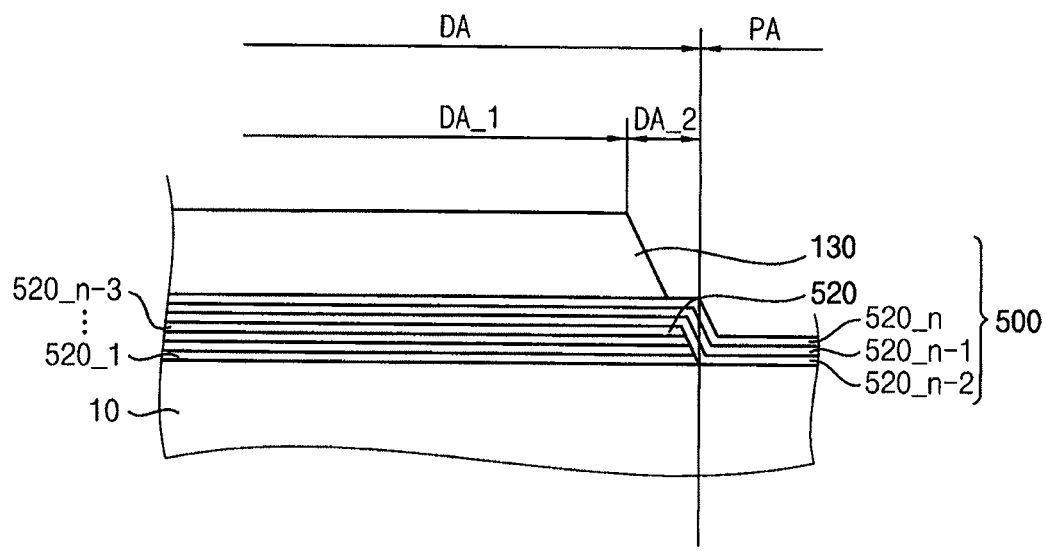

FIG. 25 illustrates a cross-sectional view depicting the optical film assembly on the display panel of FIG. 24.

Referring to FIG. 25, the side surface of the deposited anti-fingerprint film 130 may be inclined with respect to the upper surface of the anti-reflection film 520. In the present example, the upper surface of the anti-fingerprint film 130 may extend toward the display region DA_1 and the interface region DA_2.

According to the present example embodiment, a portion of the anti-reflection layers 520_1, . . . 520_n of the anti-reflection film 520 may be deposited in the peripheral region PA such that the peripheral region PA may display a reddish color. In other implementations, a portion of the anti-reflection layers 520_1, . . . 520_n disposed in the peripheral region PA may be changed so that various colors may be displayed in the peripheral region PA.

According to example embodiments, a portion of the anti-reflection layers disposed on an upper portion or a lower portion of the anti-reflection film may extend toward the peripheral region. In other implementations, a portion of the anti-reflection layers disposed on a central portion of the anti-reflection film may extend toward the peripheral region. Also, various combinations of the extended anti-reflection layers disposed in the peripheral region may be possible.

Figure 26:
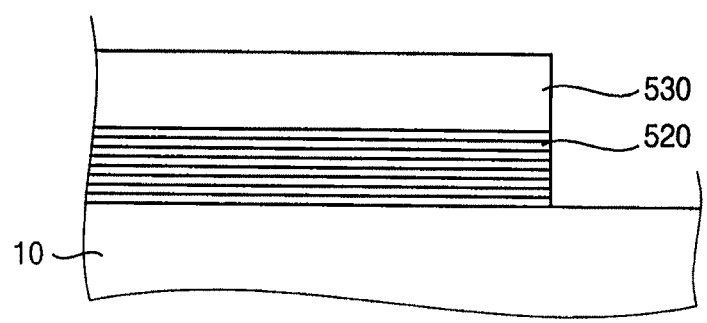
FIG. 26 illustrates a cross-sectional view depicting an optical film assembly according to another embodiment.
Figure 27A:
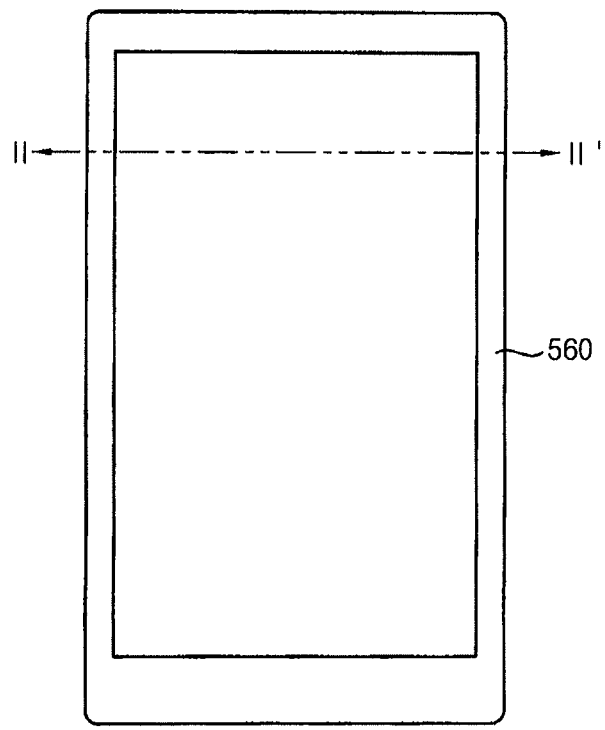
FIG. 27A illustrates a plan view depicting a mask used for manufacturing the optical film assembly of FIG. 26.
Figure 27B:
FIG. 27B illustrates a cross-sectional view taken along a line II-II' of FIG. 27A.

FIG. 26 illustrates a cross-sectional view depicting an optical film assembly according to another embodiment. FIG. 27A is a plan view illustrating a mask used for manufacturing the optical film assembly of FIG. 26. FIG. 27B illustrates a cross-sectional view taken along a line II-II' of FIG. 27A. The optical film assembly of FIGS. 26 to 27B may be substantially the same as the optical film assembly of FIGS. 4 to 11 except for a structure of a side surface of the optical film assembly and the configuration of mask used to form the optical film assembly. Thus, any disclosures concerning the same elements will not be repeated.

Referring to FIG. 26, the display apparatus may include a display panel 10 and the optical film assembly disposed on the display panel 10.

The optical film assembly may include an anti-reflection layer 520 and an anti-fingerprint layer 520 disposed on the anti-reflection layer 520.

The optical film assembly may be disposed only in an internal region DA (shown in FIG. 4) of the display panel 10, and may not be disposed in the peripheral region PA (shown in FIG. 4).

Referring to FIGS. 27A and 27B, an inner surface of the mask 560 used for manufacturing the optical film assembly may be inclined toward the outside of the optical film assembly with respect to an upper surface of the display panel 10. When the inner surface of the mask 560 is inclined toward the outside of the optical film assembly, atoms for deposition may be stacked in a direction substantially perpendicular to the upper surface of the display panel 10 along the inner surface of the mask 560.

According to the present example embodiment, the internal region, in which an image is displayed, does not include the interface region, so that preciseness of the design of the display region may be improved.

The above-mentioned example embodiments, the display panel includes an organic light emitting display apparatus. In other implementations, the display panel may include one of various other flat panel display apparatuses, such as a liquid crystal display apparatus, an electrophoretic display apparatus, a plasma display apparatus, etc.

By way of summation and review, when a flat panel display apparatus is used outdoors or indoors under bright lighting, the contrast ratio may be decreased by external light that reflects from a surface of the flat panel display apparatus, thereby deteriorating an image display quality. Also, a spot may be formed on the surface of the flat panel display apparatus due to touching the surface during operation of the flat panel display apparatus.

In order to prevent the reflection of external light and the formation of a spot, the flat panel display apparatus may have various films. However, when the flat panel display apparatus includes the various films, beauty of the flat panel display apparatus may be decreased. Also, design of the flat panel display apparatus may be restricted.

Embodiments relate to an optical film assembly capable of improving image display quality, a display apparatus having the same and a method of manufacturing the same.

According to embodiments, an anti-reflection film and an anti-fingerprint film are not formed in the peripheral region, such that the visibility of the logo, the design, etc., may be increased in the peripheral region. Also, an anti-reflection film including a metal oxide, etc., may be interposed between the anti-fingerprint film and the display panel such that the anti-fingerprint film is securely attached to the display panel.

An adhesive layer may be interposed between the display panel and the anti-reflection film to increase the adhesiveness between the optical film assembly and the display panel.

The anti-reflection film may have a multi-layer structure, such that reflectivity of the external light may be controlled. Also, a portion of the anti-reflection film may extend into the peripheral region, such that the peripheral region may display a predetermined hue, thereby improving beauty.

In addition, an interface region may be omitted from the internal region in which the image is displayed, such that the display region may be precisely designed.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope as set forth in the following claims.

What is claimed is:

1. An optical film assembly for use with a display panel, the optical film assembly comprising:
    an anti-reflection film including a plurality of stacked anti-reflection layers, at least two of the anti-reflection layers having different thicknesses and different refractivities, each anti-reflection layer of the plurality of stacked anti-reflection layers having a side end surface extending between an upper surface and a lower surface of the anti-reflection layer, the side end surface being inclined with respect to an upper surface of the display panel, the side end surfaces of the stacked anti-reflection layers being aligned such that an overall side end surface of the anti-reflection film is inclined between top surface and a bottom surface of the anti-reflection film, such that an overall thickness and number of the stacked anti-reflection layers of the anti-reflection film decreases at the side end portion of the anti-reflection film in a direction toward an end of the optical film assembly; and
    an anti-fingerprint film on the anti-reflection film, the anti-fingerprint film being integral with the anti-reflection film, the anti-fingerprint film being hydrophobic.

2. The optical film assembly as claimed in claim 1, wherein the anti-reflection layers include a plurality of low refractive layers and a plurality of high refractive layers that are alternately arranged.

3. The optical film assembly as claimed in claim 1, wherein a side end surface of the anti-fingerprint film is inclined along with, and as an extension of, the side end surface of the anti-reflection film.

4. The optical film assembly as claimed in claim 1, further including additional anti-reflection layers on top of or below the plurality of stacked anti-reflection layers, the additional anti-reflection layers extending beyond the side end surface of the plurality of stacked anti-reflection layers.

5. A display apparatus, comprising:
    a display panel including an internal region and a peripheral region surrounding the internal region, the internal region including a display region that displays an image and an interface region surrounding the display region; and
    an optical film assembly, the optical film assembly including:
    an anti-reflection film in the internal region of the display panel, the anti-reflection film including a plurality of stacked anti-reflection layers, at least two of the anti-reflection layers having different thicknesses and different refractivities, each anti-reflection layer of the plurality of stacked anti-reflection layers having a side end surface extending between an upper surface and a lower surface of the anti-reflection layer, the side end surface being inclined with respect to an upper surface of the display panel, the side end surfaces of the stacked anti-reflection layers being aligned such that an overall side end surface of the anti-reflection film is inclined with respect to the upper surface of the display panel and such that an overall thickness and number of the stacked anti-reflection layers of the anti-reflection film decreases in the interface region in a direction toward the peripheral region, and the inclined side end surface of the anti-reflection film is exposed to external light in the interface region; and
    an anti-fingerprint film on the anti-reflection film, the anti-fingerprint film being hydrophobic, wherein:
    a side end surface of the anti-reflection film is inclined with respect to an upper surface of the display panel.

6. The display apparatus as claimed in claim 5, wherein a side surface of the anti-fingerprint film is inclined along with, and as an extension of, the inclined side surface of the anti-reflection film.

7. The display apparatus as claimed in claim 5, wherein the optical film assembly further includes additional anti-reflection layers on top of or below the plurality of stacked anti-reflection layers, the additional anti-reflection layers extending into the peripheral region.

8. The display apparatus as claimed in claim 5, further comprising an adhesive layer between the display panel and the anti-reflection film to increase adhesiveness of the anti-reflection film.

* * * * *